United States Patent [19]

Aronson

[11] 4,275,766
[45] Jun. 30, 1981

[54] FLUID CONTROL SYSTEM

[76] Inventor: Harvey G. Aronson, 11 River Rd., Oceanside, N.Y. 11572

[21] Appl. No.: 53,294

[22] Filed: Jun. 29, 1979

Related U.S. Application Data

[63] Continuation-in-part of Ser. No. 875,206, Feb. 6, 1978, abandoned.

[51] Int. Cl.³ .............................................. F15D 1/02
[52] U.S. Cl. ........................................ 138/37; 405/80
[58] Field of Search ............... 405/80, 87, 89; 138/37, 138/39–46; 61/22, 23

[56] References Cited

U.S. PATENT DOCUMENTS

| 917,381 | 4/1909 | Twiford | 61/23 |
| 2,832,203 | 4/1958 | Bernard | 61/22 R X |
| 3,545,492 | 12/1970 | Scheid | 138/42 |

FOREIGN PATENT DOCUMENTS 96269  4/1960  Norway .................................... 405/87

Primary Examiner—Harry N. Haroian
Attorney, Agent, or Firm—Barry H. Freedman

[57] ABSTRACT

A fluid control system suitable for controlling the volumetric rate of fluid flowing in a conduit. This system includes a chamber communicating with a conduit, a downstream and upstream wall are formed in the chamber and each has an opening in their lower ends to permit undisturbed flow of fluid therethrough at a predetermined level. An additional orifice is formed in the upstream wall above the first opening to permit fluid entry into the chamber when the fluid exceeds the predetermined level thereby flooding the chamber between the two walls & dissipating the velocity of the fluid so as to limit the volumetric rate of flow in the conduit.

8 Claims, 5 Drawing Figures

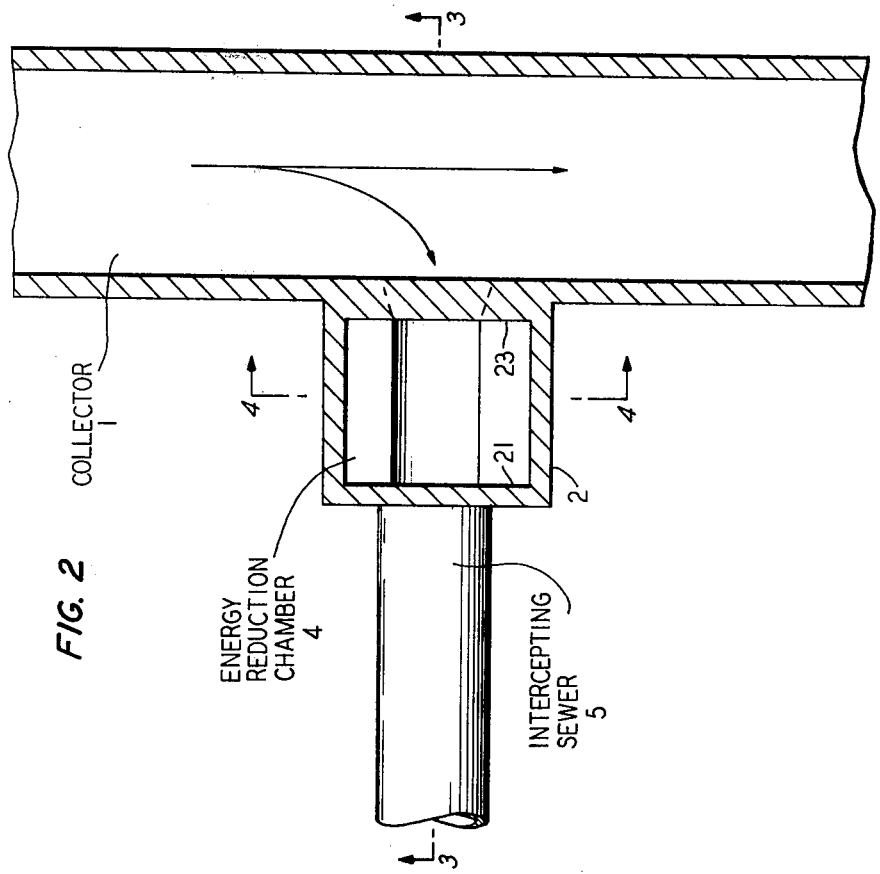
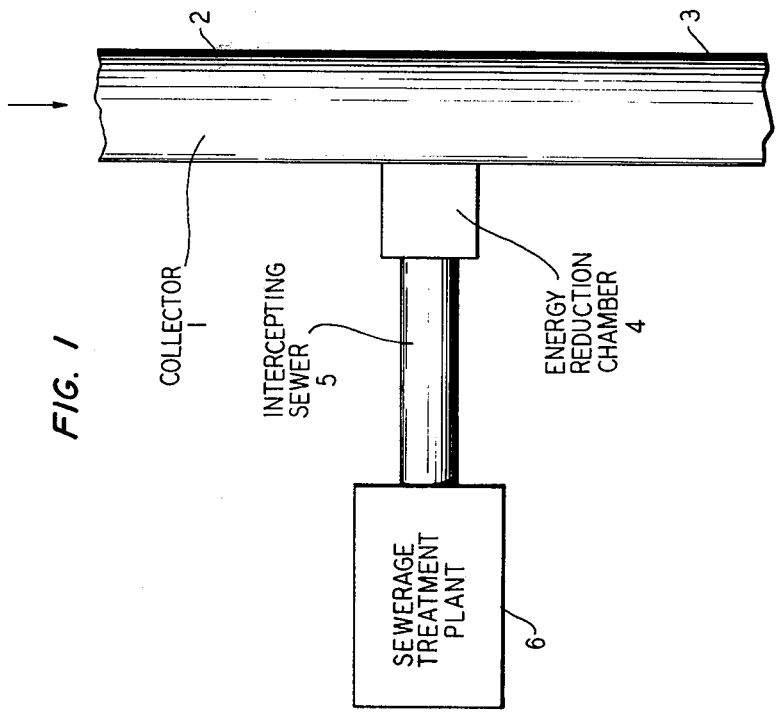

FLUID CONTROL SYSTEM

CROSS REFERENCE TO RELATED APPLICATION

This application is a continuation-in-part of my co-pending application, Ser. No. 875,206, filed Feb. 6, 1978, now abandoned.

TECHNICAL FIELD

This invention pertains generally to fluid control systems and, in particular, to systems wherein the volumetric rate of flow of fluid in a conduit is controlled or limited despite fluctuations in the fluid depth or level at the conduit inlet.

BACKGROUND OF THE INVENTION

Several well known systems for regulating the volumetric rate of fluid flowing in pipes and conduits generally include two basic elements: means for sensing the level of fluid and means for controlling the flow in response to the sensor "output". In one particular example, the sensor may be a simple float mechanically connected to a control gate or dam. When a change in the fluid level causes a displacement in the position of the float, the gate is repositioned to maintain the desired flow. In other systems, the pressures above and below a restriction in a conduit are sensed by a member responsive to pressure differences. The differential member is arranged to control the position of a valve within the conduit; if the pressure changes, the valve is repositioned so as to alter the valve opening, and hence maintain a constant rate of flow.

While the above-described systems may be effective in certain applications, they nevertheless suffer a significant deficiency in that either or both the sensor and the control means must physically move in order to effectuate the desired control. If either element becomes jammed or is otherwise rendered immobile, the ability to regulate the fluid flow is lost, and serious damage may ensue. The possibility of such an occurrence is underscored by virtue of the extremely deleterious environment in which the control system functions. When located, for example, in a sanitary sewer system, the mechanical elements in a prior art fluid flow control system are subject to rapid rust and detereoration unless a strict program of preventative maintenance is instituted.

In view of the foregoing, the broad object of the present invention is to provide an improved system for regulating the rate of fluid flow in a conduit or duct, wherein moving parts are not required either to sense changes in the fluid level or to control the flow rate in response to the sensor output. Additional objects are to provide such a system which is both easy and inexpensive to design, construct, install and maintain.

SUMMARY OF THE INVENTION

The foregoing objects are achieved in accordance with the present invention by positioning one or more energy reduction chambers within a conduit in which fluid flow is to be controlled. East energy reduction chamber is arranged to permit free flow of fluid in a channel therein when the fluid is below a predetermined depth. Upon an increase in the fluid level at the inlet, the chamber is flooded and the flow in the channel is thus submerged, thereby dissipating a portion of the velocity of the fluid passing through the channel. This dissipation results from the interaction between the high velocity fluid entering the submerged channel and the slow velocity fluid in the flooded chamber. This dissipation in turn tends to regulate or limit further increases in the volumetric flow rate.

Each energy reduction chamber, in accordance with the invention, includes a first or downstream wall transverse to the channel which extends downwardly from the chamber roof with an opening in the lower portion of the wall that is adapted to permit the undisturbed flow of fluid in the channel below the predetermined depth, and a second, similar, upstream wall which further includes an orifice formed therein. The orifice is arranged to permit entry of fluid into the chamber defined by the walls and consequent flooding of the chamber when the fluid level in the conduit inlet exceeds the aforementioned predetermined level. The width of the chamber is desirably at least three times the width of the channel.

BRIEF DESCRIPTION OF THE DRAWING

The fluid control system of the present invention will be more fully understood from a consideration of the following detailed description, when read in light of the accompanying drawing in which:

FIG. 1 is a schematic representation illustrating the use of the present invention in a sewer system;

FIG. 2 is a plan view of one form of an energy reduction chamber constructed in accordance with the present invention, as it would be used in the system of FIG. 1;

DETAILED DESCRIPTION

Figure 3:
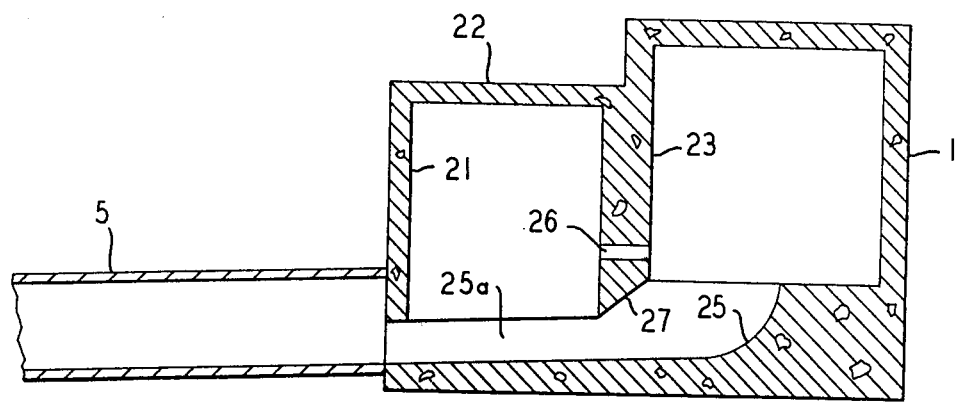
FIG. 3 is a section view of the chamber of FIG. 2, taken lingitudinally or along the direction of fluid flow.

Referring first to FIG. 1, there is shown one application of the instant invention, namely, the control of fluid flow in a sewer system. A combined sewer or collector 1 receives both residential/commercial waste water (sewerage) and storm water from various sources connected to its input or upstream end 2. An energy reduction chamber (ERC) 4 constructed in accordance with this invention communicates with collector 1 and with an intercepting sewer 5 which is, in turn, connected to a sewerage treatment plant 6. Chamber 4 operates as follows: when the fluid flow in collector 1 is at or below a predetermined depth, generally set at twice the mean dry flow, fluid entering at the upstream end 2 is diverted into intercepting sewer 5 and thence flows to the nearest treatment plant 6 for precessing. However, when the level in collector 1 rises above the aforesaid level, for example, during periods of heavy storm water runoff, chamber 4 acts to limit or regulate the flow into sewer 5 so as not to disrupt operation of the treatment plant. Instead, the excess fluid volume is carried directly to the output or downstream end 3 of the collector, generally for discharge into a nearby river or bay. Obviously, many other uses for the present invention may be found, and regulation as described above is intended to be illustrative only.

Figure 4:
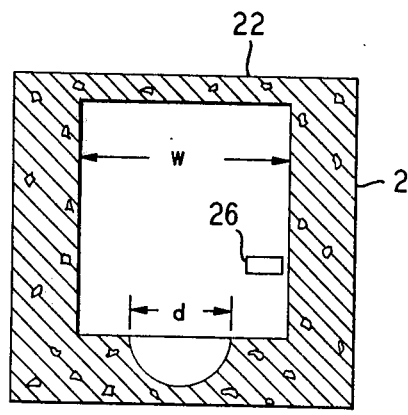
FIG. 4 is a section view of the chamber of FIG. 2, taken transverse to the direction of fluid flow.

Continuing with the above example, one construction for chamber 4 may be as shown in FIGS. 2-4, wherein like elements retain like designations. The chamber 4 generally includes a downstream wall 21 extending downwardly from the roof 22 of the chamber, and an upstream wall 23, also extending downwardly from roof 22. The entire chamber 4 communicates, at its downstream end, through an opening at the bottom of wall 21, with intercepting sewer 5, and at its upstream end, through an opening at the bottom of wall 23, with collector 1. The connection between chamber 4 and collector 1 advantageously effects a smooth transition therebetween, and may include a tapered portion 27 at the upper end of the opening in wall 23 and a curved ramp or sluiceway 25 which continues as a semi-circular channel 25a along the floor of chamber 4. The chamber may also include a sloping floor to maintain a smooth transition. Walls 21 and 23 are generally transverse to channel 25a. While equal dimensions are shown for channel 25a and sewer 5 in FIGS. 2-3, one or the other may be made larger if desired, or more than one energy reduction chamber may be utilized, as described hereinafter. It is desirable, however, that the inside width w of chamber 4 be at least three times the width d of channel 25a, as shown in FIG. 4.

Formed in wall 23, at a predetermined height above the floor of chamber 4, is an orifice 26 which permits communication between collector 1 and the interior of chamber 4. The orifice is preferably formed near the lower end of wall 23 and positioned so as to be vertically offset from channel 25a (ie, not directly above the channel), as shown in FIGS. 3 and 4.

In operation, when the fluid level in collector 1 is below the predetermined depth set by the opening in the lower ends of walls 21 and 23, a smooth flow pattern is established from the collector through sluiceway 25 and channel 25a to sewer 5, such that little or no fluid is discharged at the downstream end 3 of the collector. The flow just described is not impeded or disturbed by walls 21 or 23, since the fluid depth is just at or below the top of the openings in both walls.

Upon an increase in the flow rate in collector 1, the depth or level of fluid therein will rise, so that fluid from collector 1 will enter chamber 4 via orifice 26. Such fluid entry will raise the depth in chamber 4 to a level above the top of the opening in wall 21, so that the flow in channel 25a will be "submerged", thereby dissipating a portion of the velocity of the fluid passing through the channel. Dissipation results from the interaction between the relatively high velocity fluid entering the submerged channel and the relatively slow velocity fluid contained in the flooded chamber. This, in turn, tends to reduce or control the volume of fluid flow through chamber 4 and into sewer 5, as is desired.

The foregoing control is achieved by virtue of the fact that the total energy in any unit volume of fluid flow includes two components, one from the fluid depth and pressure and the second from the fluid velocity (velocity head). In the energy reducing chamber, a large amount of turbulence resulting from the interaction between the high velocity fluid entering the channel and the slow moving fluid in the flooded chamber has the effect of significantly dissipating the velocity head; this decrease in velocity head prevents the increase in depth of fluid in collector 1 from increasing the volume of fluid flow through chamber 4 and into sewer 5. Stated differently, the volume flow through chamber 4 does not increase when the level in collector 1 exceeds the predetermined depth; rather, the presence of chamber 4 causes a significant reduction in the flow that would otherwise enter sewer 5, and this excess is discharged, as desired, via the downstream or outlet portion 3 of collector 1.

Several design criteria exist for practical implementation of an energy reduction chamber in accordance with the present invention. First, the flow channel in the chamber is preferably of a shape that insures a smooth or non-turbulent flow into, through and out of the chamber when the fluid level is below the orifice described above. Second, the orifice should be located just above the bottom end of the upstream wall defining each chamber, and should be only large enough to permit rapid flooding of the chamber when the upstream level increases beyond the predetermined depth. The orifice is desirably positioned other than vertically above the channel in the chamber. Third, the fluid flowing in the chamber just prior to flooding should have substantial velocity, so that sufficient turbulence is created within the chamber when flooding does occur. Fourth, the flow channel in the energy reduction chamber should be as long as feasible, so as to provide the maximum area of contact and consequently the maximum interaction between the velocity of fluid entering the flow channel and the slow velocity fluid in the flooded chamber. Fifth, the opening in the downstream wall of the chamber should be shaped to provide smooth thru-flow when the level in the chamber is at or below the predetermined depth and to provide maximum turbulence when the level in the chamber is above the predetermined depth. Sixth, the width, measured transverse to the channel, of the chamber should be at least three times as great as the width of the channel itself, in order to insure that the fluid in the flooded chamber will have a slow velocity. Finally, the invention should be used in situations in which open channel, rather than pressurized flow generally exists, even though successful operation would be attained despite complete submergence of the upstream end of the conduit.

Figure 5:
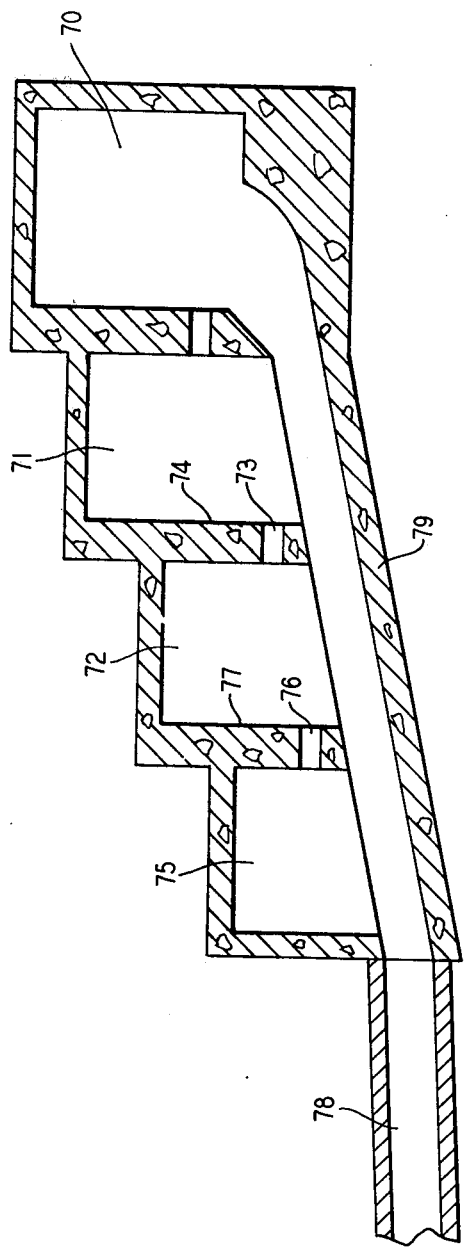
FIG. 5 illustrates the use of several energy reduction chambers in a cascade arrangement.

In practical applications in sewer systems of conventional dimensions, a single energy reduction chamber could be 4 to 10 feet in length, width and height, and the channel could be one to two feet in width and height, although such dimensions are not intended as limitations of the scope of the present invention. The orifice could be 12 inches long and 6 inches wide, also by way of example only. To attain a greater degree of fluid control, several energy reduction chambers could be cascaded, as shown in FIG. 5. In that figure, a first chamber 71 communicates with conduit 70, and with a second chamber 72; an orifice 73 exists in the wall 74 between chambers 71 and 72. Similarly, a third chamber 75 communicates with chamber 72, and an orifice 76 exists in the wall 77 between those chambers. The downstream end of chamber 75 is connected to an outlet conduit 78, as in prior examples, and the entire structure shares a common channel 79 which permits undisturbed flow between conduits 70 and 78 when the level in the former is below a level to be controlled. The same design criteria mentioned above would apply to a series of connecting chambers as shown in FIG. 5.

Various modifications and adaptations of the present invention will be readily apparent to those skilled in the art. For that reason, it is intended that the invention be limited only by the appended claims.

What is claimed is:

1. An energy reduction chamber for controlling the volumetric rate of fluid flowing in a conduit, said chamber including (a) a bottom wall with a channel formed therein, said channel being adapted to communicate with said conduit, (b) a downstream and an upstream wall formed transverse to said channel, each of said walls having an opening in its lower end adapted to permit undisturbed flow of fluid in said channel below a predetermined fluid level, and (c) an orifice formed in said upstream wall for permitting fluid entry into said chamber defined by said walls when said fluid exceeds said predetermined level, thereby flooding said chamber and dissipating the velocity of said fluid so as to limit said volumetric rate of flow, wherein the width of said chamber is at least three times the width of said channel.

2. The invention defined in claim 1 wherein said orifice is vertically offset from said channel.

3. Apparatus for limiting the rate of fluid flowing in the outlet portion of a conduit as a function of the fluid level in the inlet portion of said conduit comprising (a) an energy reducing chamber including a smooth channel communicating between said inlet and outlet portions for permitting undisturbed fluid flow when said inlet fluid level is below a predetermined depth, (b) means for flooding said chamber with fluid and thereby submerging said channel when said inlet fluid level exceeds said predetermined depth, creating a fluid backup in said conduit, and (c) means communicating with said conduit for discharging said fluid backup.

4. The invention defined in claim 3 wherein the width of said chamber is at least three times the width of said channel.

5. The invention defined in claim 4 wherein said energy reducing chamber includes a first partial wall communicating with said upstream portion and a second partial wall communicating with said outlet portion, and said flooding means includes an orifice formed in said first wall at a depth above said predetermined depth.

6. The invention defined in claim 5 wherein said orifice is offset from a position vertically above said channel.

7. An energy reduction chamber for controlling the volumetric rate of fluid flowing in a conduit, said chamber adapted to receive fluid flowing in said conduit and including (a) a bottom wall including a channel portion formed therein for communication with said conduit, (b) a downstream and an upstream wall formed transverse to said conduit, each of said walls having an opening in its lower end adapted to permit undisturbed flow of fluid in said conduit below a predetermined fluid level, and (c) an orifice formed in said upstream wall for permitting fluid entry into said chamber defined by said walls when said fluid exceeds said predetermined level, thereby flooding said chamber and dissipating the velocity of said fluid so as to limit said volumetric rate of flow, wherein the width of said chamber is at least three times the width of said conduit.

8. Apparatus for limiting the rate of fluid flowing in the downstream outlet portion of a conduit when the fluid level in the upstream inlet portion of said conduit rises above a predetermined level, said apparatus comprising:

(a) an energy reducing chamber positioned in said conduit between said upstream inlet and downstream outlet portions of said conduit, said energy reducing chamber including a channel communicating between said inlet and outlet portions for permitting uninterrupted fluid flow from said upstream inlet portion of said conduit through said channel in said energy reducing chamber and through said downstream outlet portion of said conduit, when the fluid level of said upstream inlet portion of said conduit is at or below said predetermined level;

(b) means for flooding said energy reducing chamber with fluid and thereby submerging said channel when the fluid level of said upstream inlet portion of said conduit rises above said predetermined level, said fluid level rise caused by an increase in the rate of flow of fluid entering said upstream inlet portion of said conduit;

(c) said energy reducing chamber further including an inlet portion including a wall with an opening which communicates with said upstream inlet portion of said conduit, and an outlet portion which includes a second wall with an opening which communicates with said downstream outlet portion of said conduit;

(d) said means for flooding said energy reducing chamber including an orifice formed in said wall of said inlet portion of said energy reducing chamber, the bottom of said orifice being located at said predetermined level;

(e) said orifice in said wall of said inlet portion of said energy reducing chamber being offset from a position vertically above said channel of said energy reducing chamber and said opening in the inlet portion of said energy reducing chamber, such that no part of said orifice is vertically above said channel in said energy reducing chamber and said opening in said inlet portion of said energy reducing chamber; and (f) means communicating with said upstream inlet portion of said conduit for discharging the increase in rate of flow of fluid that enters said upstream inlet portion of said conduit and that raises the level of fluid of said upstream inlet portion of said conduit above said predetermined level, and that cannot pass through said energy reducing chamber because said flooding of said energy reducing chamber has limited the rate of flow of fluid entering said energy reducing chamber.

* * * * *